Patented June 28, 1949

2,474,333

UNITED STATES PATENT OFFICE 2,474,333

DIPHENYLAMINE SULFONAMIDE DYESTUFFS

George W. Seymour and Victor S. Salvin, Cumberland, and Wilford Donald Jones, Cresaptown, Md., assignors to Celanese Corporation of America, a corporation of Delaware No Drawing. Application March 5, 1946, Serial No. 652,234

4 Claims. (Cl. 260—397.7)

This invention relates to diphenylamine dyestuffs and relates more particularly to certain novel diphenylamine dyestuffs suitable for the dyeing of cellulose acetate or other organic derivative of cellulose materials.

An object of this invention is the preparation of improved diphenylamine dyestuffs dyeing in golden-yellow to golden-brown shades and having an excellent degree of affinity for cellulose acetate or other organic derivative of cellulose textile materials.

Another object of this invention is the dyeing of cellulose acetate or other organic derivative of cellulose materials with said novel dyestuffs whereby dyed materials which do not bleed when either wet or dry and which exhibit excellent resistance to light, washing and acid-fading may be obtained.

Other objects of this invention will appear from the following detailed description.

A wide variety of dyestuffs for cellulose acetate or other organic derivative of cellulose textile materials is available in a substantially complete range of shades. However, certain shades which are available are not sufficiently fast to one or another of the various agencies which tend to cause undesirable changes in the shade of the dyed textile material. For example, such changes in shade may take place as a result of washing or on prolonged exposure to ultra-violet light. Certain other dyes are prone to wet or dry bleeding and, under the influence of heat and pressure, or during ironing, tend to transfer or mark-off from dyed portions of the fabric to undyed portions. All of these properties are obviously undesirable and improved dyestuffs dyeing in attractive shades and free of the above and other disadvantageous characteristics are constantly sought.

We have now found that diphenylamine dyestuffs of the general formula:

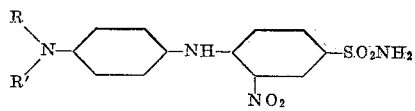

wherein R and R' may be hydrogen or an alkyl group such as, for example, methyl, ethyl, propyl, isopropyl, butyl, amyl, hexyl, octyl, decyl or dodecyl, a hydroxyalkyl group containing one or more hydroxy groups such as, for example, hydroxyethyl, hydroxymethyl, hydroxypropyl or dihydroxypropyl, or an acyl group such as, for example, an acetyl, propionyl, or butyryl group, form a class of dyestuffs which are particularly suitable for dyeing cellulose acetate or other organic derivative of cellulose materials in fast, golden-yellow to golden-brown shades of superior resistance to wet or dry bleeding, to light, washing and to various other detrimental agencies.

The novel dyestuffs of our invention may be prepared by condensing 4-chloro-3-nitro-benzene sulfonamide with the desired para-amino-substituted aniline in the presence of an acid binding agent, such as sodium carbonate. As examples of suitable para-substituted anilines which may be employed in forming the novel dyestuffs of our invention there may be mentioned p-amino-acetanilide; p-amino-propionanilide; p-amino-N-methyl-acetanilide, p-amino-N-methyl-propionanilide, p-amino-N-hydroxyethyl-acetanilide, p-phenylene-diamine, p-dimethylamino-aniline, p-diethylamino-aniline, p-(methyl-β-hydroxyethyl)-amino-aniline, p-(ethyl-β-hydroxyethyl)-amino-aniline, p-di-(β-hydroxyethyl)-amino-aniline, p-di-(β-hydroxypropyl)-amino-aniline, p-di-(β-α-dihydroxypropyl)-amino-aniline, p-mono-(β-hydroxyethyl)-amino-aniline, p-mono-(β-hydroxypropyl)-amino-aniline, and p-mono-(β-α-dihydroxypropyl)-amino-aniline.

Preferably, the condensation reaction is carried out employing a suitable medium such as, for example, water, an organic liquid, such as the mono-ethyl ether of ethylene glycol, or in an excess of the amine, which excess acts as a solvent during the condensation. Other solvents which may be employed are, for example, ethyl alcohol, amyl alcohol, methyl "Cellosolve" or ethylene glycol monoacetate.

When the condensation reaction is carried out in a medium comprising water, an organic liquid such as the mono-ethyl ether of ethylene glycol or in another inert liquid medium which takes no part in the reaction, the reaction is effected by employing from 1 to 3 mols of the para-amino-substituted aniline for each mol of 4-chloro-3-nitro-benzene sulfonamide employed. Usually, reflux is employed where the reaction is carried out in an inert liquid medium, a temperature of 80 to 140° C. being maintained until the condensation reaction is completed, say, in 4 to 12 hours. Where an excess of the amine is employed as the reaction medium, from 3 to 5 mols of the amine may be employed for each mol of 4-chloro-3-nitro-benzene sulfonamide, the reaction being carried out at a temperature sufficiently high to maintain the reactants in a molten condition, i. e. from 100 to 140° C. Under these conditions the reaction may be completed in from about 2 to 6 hours.

The dyestuffs formed may be recovered from the reaction mass, where a melt condensation reaction is employed, by drowning the molten reaction mass in water and filtering off the insoluble dyestuff which precipitates. Where a liquid medium such as water is employed to effect the condensation reaction, the insoluble dyestuff formed usually crystallizes out as the reaction proceeds and may be recovered by filtration. Recovery of the dyestuffs from a reaction medium comprising an organic liquid may be effected by steam-distilling the excess amine and organic liquid from the reaction mass and then filtering the solid dyestuff from the aqueous medium remaining. Excellent yields of said novel dyestuffs may be obtained.

While we preferably employ sodium carbonate as the acid-binding agent during the condensation reaction, other acid binding agents such as sodium acetate, magnesium oxide, calcium carbonate or calcium hydroxide may be employed.

In order further to illustrate our invention but without being limited thereto the following examples are given:

Example I 237 parts by weight of dry 4-chloro-3-nitrobenzene sulfonamide, 450 parts by weight of p-amino-acetanilide and 55 parts by weight of sodium carbonate are melted together with stirring. The reaction mixture obtained is stirred at 130° C. for 6 hours during which time it turns brown in color. After heating for 6 hours, the molten mass is poured with stirring into 500 parts by weight of hydrochloric acid (specific gravity 1.18) dissolved in 5000 parts by weight of water, the resulting dilute hydrochloric acid being maintained at 80° C. The mass is stirred for 30 minutes and the precipitated dyestuff is then filtered employing suction. The press cake is resludged with 1000 parts by weight of water heated to 80° C., and the dyestuff is again filtered under suction, the suction being maintained until the press cake is nearly dry. 335 parts by weight of 4'-acetamino-2-nitro-diphenylamine-4-sulfonamide are obtained which is equivalent to a yield of 95%. The dyestuff dyes cellulose acetate materials in golden-yellow shades. The dyed material exhibits an excellent degree of fastness to light, dry bleeding, washing and to acid fading.

Example II 237 parts by weight of dry 4-chloro-3-nitrobenzene sulfonamide, 270 parts by weight of para-(ethyl-β-hydroxyethyl)-amino-aniline, 55 parts by weight of sodium carbonate and 2500 parts by weight of water are heated to reflux, i. e. 100° C. while stirring, the reaction mixture being maintained under reflux for 3 hours. The condensation reaction takes place quite rapidly and the dyestuff separates from solution as an oil. At the completion of the reaction, the oil may be dissolved in 5% aqueous hydrochloric acid and salted from the solution as the hydrochloride. 340 parts by weight of 4'-(ethyl-β-hydroxyethyl)-amino-2-nitro-diphenyl-amine-4-sulfonamide are obtained comprising a yield of 90%. This dyestuff dyes cellulose acetate materials in golden-brown shades and the dyed materials exhibit excellent resistance to dry bleeding, washing and light.

Example III 237 parts by weight of dry 4-chloro-3-nitrobenzene sulfonamide, 272 parts by weight of para-dimethylamino-aniline, 55 parts by weight of sodium carbonate and 2500 parts by weight of the monoethyl ether of ethylene glycol are heated under reflux, i. e. at 135° C., for 10 hours. The reaction mixture turns a red-brown color. The excess para-dimethylamino-aniline and monoethyl ether of ethylene glycol are removed by steam distillation. The solid dyestuff is filtered off, washed and dried. 320 parts by weight of 4'-dimethylamino-2-nitro-diphenylamine-4-sulfonamide are obtained, which is equivalent to a yield of 95%. This dyestuff dyes cellulose acetate materials in warm golden-tan shades, exhibiting excellent resistance to washing, dry bleeding and light.

It is to be understood that the foregoing detailed description is given merely by way of illustration and that many variations may be made therein without departing from the spirit of our invention.

Having described our invention what we desire to secure by Letters Patent is:

1. Diphenylamine dyestuffs of the following general formula:

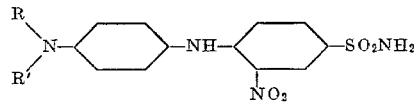

wherein R and R' are members of the group consisting of hydrogen, alkyl, hydroxyalkyl and lower alkyl carbonyl acyl radicals.

2. The diphenylamine dyestuff of the following formula:

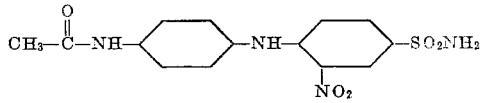

3. The diphenylamine dyestuff of the following formula:

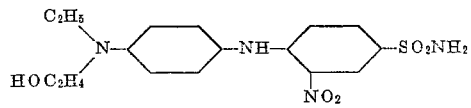

4. The diphenylamine dyestuff of the following formula:

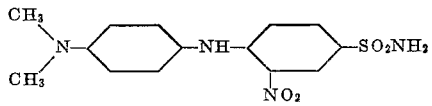

GEORGE W. SEYMOUR.
VICTOR S. SALVIN.
WILFORD DONALD JONES.

REFERENCES CITED

The following references are of record in the file of this patent:

UNITED STATES PATENTS

| Number | Name | Date |
| --- | --- | --- |
| 1,709,292 | Wagner | Apr. 16, 1929 |
| 2,080,704 | Fischer et al. | May 18, 1937 |

OTHER REFERENCES

Fischer, "Berichte deutsche Chem. Gesell.," vol. 24, (1891), p. 3794.

Ullman, "Liebigs Annalen," vol. 366 (1909), p. 107.

Patent No. 2,474,333     Certificate of Correction

GEORGE W. SEYMOUR ET AL.     June 28, 1949

It is hereby certified that error appears in the printed specification of the above numbered patent requiring correction as follows:

Column 4, line 36, after the word "carbonyl" strike out "acyl"; and that the said Letters Patent should be read with this correction therein that the same may conform to the record of the case in the Patent Office.

Signed and sealed this 20th day of December, A. D. 1949.

[SEAL]

THOMAS F. MURPHY,
*Assistant Commissioner of Patents.*